(12) United States Patent
Tevis

(10) Patent No.: US 7,680,926 B2
(45) Date of Patent: Mar. 16, 2010

(54) APPARATUS, SYSTEM, AND METHOD FOR DYNAMICALLY DETERMINING A SET OF STORAGE AREA NETWORK COMPONENTS FOR PERFORMANCE MONITORING

(75) Inventor: Gregory John Tevis, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1054 days.

(21) Appl. No.: 11/362,975

(22) Filed: Feb. 27, 2006

(65) Prior Publication Data

US 2007/0208920 A1 Sep. 6, 2007

(51) Int. Cl.
*G06F 15/173* (2006.01)
(52) U.S. Cl. ........................... 709/224; 709/220
(58) Field of Classification Search .......... 709/224, 709/238, 220
See application file for complete search history.

(56) References Cited

U.S. PATENT DOCUMENTS 6,901,582 B1  5/2005  Harrison ............... 717/127
7,194,538 B1 * 3/2007  Rabe et al. ............. 709/224
2004/0088606 A1 * 5/2004  Robison et al. .......... 714/47
2004/0148485 A1  7/2004  Suzuki ................... 711/170
2004/0205206 A1  10/2004  Naik et al. .............. 709/230

FOREIGN PATENT DOCUMENTS

WO    WO 2004/068786    8/2004

* cited by examiner

Primary Examiner—Salad Abdullahi
Assistant Examiner—El Hadji M Sall
(74) Attorney, Agent, or Firm—Kunzler & McKenzie

(57) ABSTRACT

An apparatus, system, and method are disclosed for dynamically determining a set of Storage Area Network (SAN) components for performance monitoring. The computer program product monitors SAN components of a predefined set of SAN components according to a monitor data structure associated with each SAN component. At least one attribute of the set of SAN components is changed in response to a threshold violation by a SAN component in the set. The SAN components of the changed set are monitored according to the monitor data structure for each SAN component within the changed set as part of a monitoring feedback loop.

16 Claims, 7 Drawing Sheets

APPARATUS, SYSTEM, AND METHOD FOR DYNAMICALLY DETERMINING A SET OF STORAGE AREA NETWORK COMPONENTS FOR PERFORMANCE MONITORING

BACKGROUND OF THE INVENTION

1. Field of the Invention

This invention relates to Storage Area Network (SAN) management and more particularly relates to determining a set of SAN components for performance monitoring.

2. Description of the Related Art

Storage performance management and analysis has led to significant improvements in computer hardware, hardware controllers, and software. Storage performance management and analysis facilitates identification of data I/O bottlenecks and points of underutilization. In particular, monitoring and analyzing hardware devices, firmware, and hardware control software has led to great technological advances. One such advance is the design, standardization, and adoption of a Storage Area Network (SAN).

SANs are often used in large organizations such as enterprise environments having many servers and many storage devices. A SAN is an inter-networked set of hardware devices that enables storage devices such as disk drives, tape drives, optical drives and the like to exchange storage data with end-user applications and/or servers dedicated to storing and retrieving data. A typical SAN may include a complex network of Host Bus Adapters, Ports, a maze of Switches (often connected via InterSwitch Links (ISLs)), Virtualization solutions, Storage Subsystem Ports, and Storage Subsystem Volumes between the application that originates the data and the hardware storage device actually storing the data.

Storage data travels from an application on one end of the SAN to a storage device on the other end of the SAN along a data storage path. Typically, due to the complexity of the SAN, the data storage path varies with each I/0 as the data is routed across the SAN. Along the data storage path a variety of SAN components and parameters can affect how efficiently and successfully the storage data travels through the SAN. Monitoring the performance of the SAN as a whole permits actions to be taken to avoid bottlenecks of storage data or underutilization of SAN components. Such monitoring can not be performed at the application level because there is no single application that controls all the entry and exit points to the SAN. Consequently, the SAN components are monitored at the firmware, communication port, and hardware device levels.

Unfortunately, monitoring SAN components at such a low level becomes difficult due to the high number of SAN components and the high volumes of storage monitoring data that are generated by these SAN components. All of the monitoring data that is collected is stored such that analysis and troubleshooting queries can be performed. Unfortunately, the vast majority of the monitoring data collected may not even be relevant to a particular bottleneck or storage management problem being researched. In addition, SAN component monitoring should be performed in a manner that creates minimal interference with storage I/O traveling through the SAN. The more SAN storage performance data collected, the higher the impact of the performance monitoring on overall SAN performance. Finally, SAN component performance monitoring typically requires monitoring for a period of days so that error conditions can be detected as problems requiring action rather than anomalies.

Even if all the monitoring data produced by monitoring all the SAN components in a typical SAN could be collected and stored, analyzing such high volumes of data is difficult. The complexity of the SAN and its constituent components makes it difficult for analysts to determine cause and effect relationships such that action can be taken to remedy a problem. Part of the difficulty comes in distinguishing normal performance data from abnormal performance data. Often monitoring thresholds are set and crossed while the context of the operation indicates that the activity crossing the threshold is normal. Monitoring at such a low level often means that contextual information relating to a monitored event is lost. This further complicates the performance monitoring task on a SAN.

Therefore, operators and managers of the SAN must be selective in determining which SAN components to monitor. Consequently, the results of such manually defined SAN component monitoring are suspect because of a concern that some SAN component that played a role in the performance results were missed in the definition of the set of SAN components to be monitored.

In addition, SAN configurations are typically very dynamic. Hardware and software devices that are connected to or members of the SAN may change from day to day very rapidly. Such a dynamic environment requires that manual definition of a set of SAN components for monitoring must be constantly updated. Even storage management systems that automate detection of SAN components, suffer from the lack of an ability to adequately collect enough data, from enough SAN components, for a sufficient time period, to make analysis and problem resolution feasible.

From the foregoing discussion, it should be apparent that a need exists for an apparatus, system, and method that dynamically determines a set of storage area network components to be included in storage performance monitoring. Beneficially, such an apparatus, system, and method would dynamically adjust the members of the set of SAN components being monitored and/or the monitoring attributes associated with each SAN component in the set. Such an apparatus, system, and method would determine based on historical monitoring information which members of the set merit a closer analysis to identify problem areas.

SUMMARY OF THE INVENTION

The several embodiments of the present invention have been developed in response to the present state of the art, and in particular, in response to the problems and needs in the art that have not yet been fully solved by currently available storage performance monitoring systems. Accordingly, the present invention has been developed to provide an apparatus, system, and method for dynamically determining a set of storage area network (SAN) components for performance monitoring that overcome many or all of the above-discussed shortcomings in the art.

The system to dynamically determine a set of storage area network (SAN) components for performance monitoring is provided with a logic unit containing a plurality of modules configured to functionally execute the necessary operations for determining attribute modifications to a set of SAN components. These modules in the described embodiments include a storage management module, a storage monitoring module, and a feedback monitoring utility. Optionally, the logic unit may include an analysis module, a determination module, a modification module, and a detection module.

The storage management module communicates with and directs operation of a plurality of SAN components within a SAN. The storage monitoring module monitors a predefined set of SAN components within the SAN according to a monitor data structure associated with each SAN component. The feedback monitoring utility changes an attribute of the set of SAN components in response to at least one threshold violation by one of the SAN components in the set and causes the storage monitoring module to monitor SAN components of the changed set of SAN components. The feedback monitoring utility may change membership of the set of SAN components and/or change at least one monitor attribute of at least one monitor data structure associated with the set of SAN components such that the frequency of threshold violations changes.

In addition, an optional analysis module may apply SAN component analysis criteria to members of the changed set of SAN components based on historical monitoring information and respond based on analysis results. In certain embodiments, the determination module identifies at least one SAN component connected to the SAN component responsible for the threshold violation. The connection may be physical or logical. A modification module may modify the set of SAN components to include the identified one or more connected SAN components. A detection module may query SAN components to determine at least one SAN component logically connected to the SAN component responsible for the threshold violation, the at least one logically connected SAN component being a member of a SAN zone that includes the SAN component responsible for the threshold violation.

In further embodiments, the operations of the present invention may include monitoring SAN components of a predefined set of SAN components according to a monitor data structure associated with each SAN component, changing an attribute of the set of SAN components in response to at least one threshold violation by a SAN component in the set, and monitoring SAN components of the changed set according to the monitor data structure for each SAN component within the changed set.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
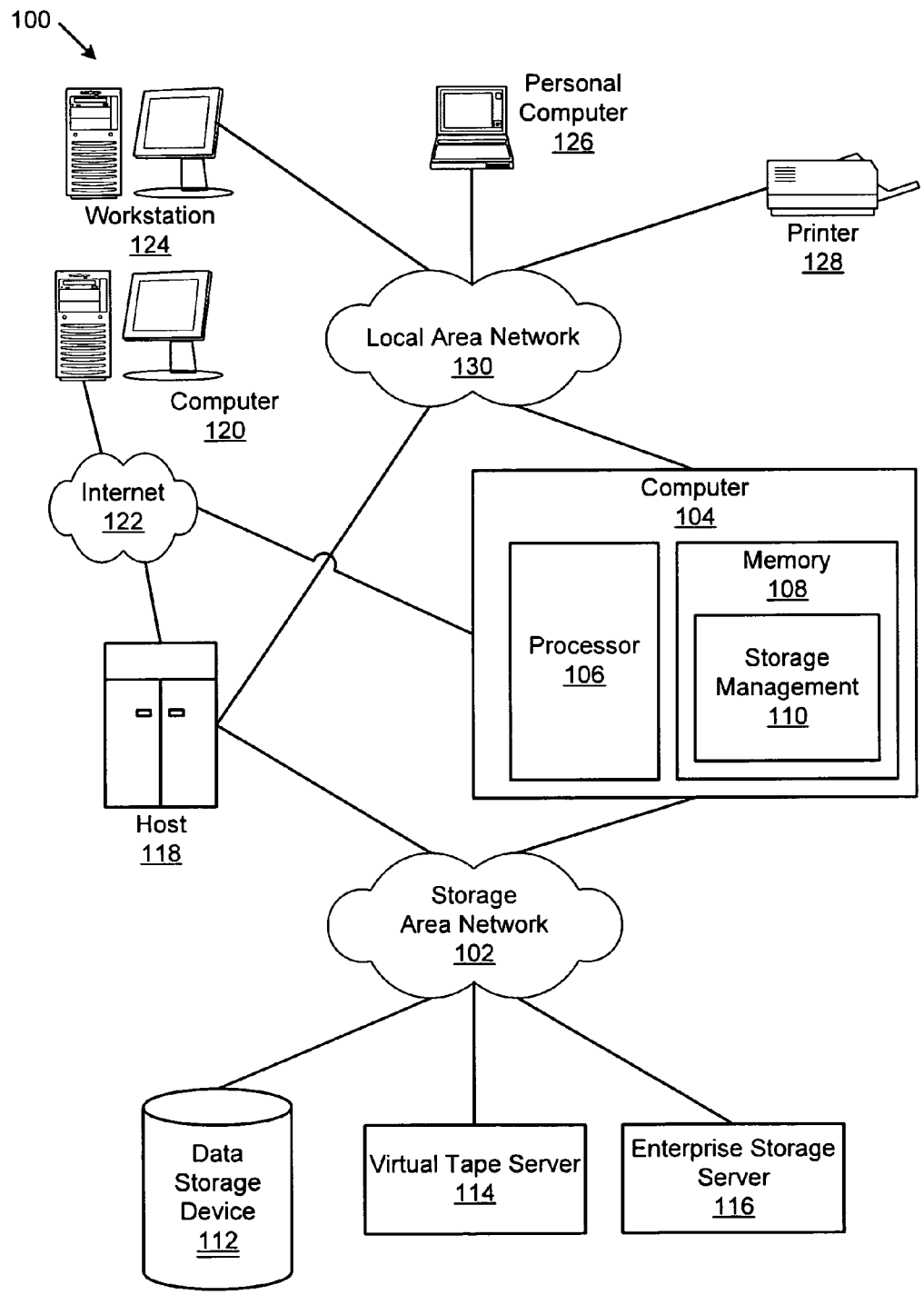
FIG. 1 is a schematic block diagram illustrating a system for dynamically determining a set of SAN components for performance monitoring.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams described herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 is a schematic block diagram illustrating a system 100 for dynamically determining a set of storage area network ("SAN") components for performance monitoring. The system 100 includes a storage area network ("SAN") 102 and a computer 104. The SAN 102 includes the appropriate hardware to implement common SAN protocol such as Internet Small Computer System Interface (iSCSI) and/or Fibre Channel. The computer 104 includes a processor 106 and a memory 108. The memory 108 includes a storage management module 110 capable of monitoring SAN components and will be described in subsequent figures. The SAN 102 is connected to at least one data storage device 112, but may also include other SAN components, storage subsystems, and systems such as a virtual tape server ("VTS") 114 or an Enterprise Storage Server® ("ESS") 116 from IBM®. The SAN 102 may also connect to a host 118 or other network capable device.

The host 118 may connect to one or more computers 120 through the Internet 122 or may connect to devices such as workstations 124, personal computers 126, printers 128, and the like through a local area network 130. The computer 104 with the storage management module 110 may also connect to the local area network ("LAN") 130 and/or to the Internet 122. The storage management module 110 may reside on any device or computer capable of accessing the SAN 104, wired or wireless, such as the host 118, the computer 120 with Internet 122 access, the data storage device 112, the VTS 114, the ESS 116, or other device on the local area network 130 that may access the SAN 104. The storage management module 110 may execute on a single computer or device or may be distributed among a plurality of computing devices.

FIG. 1 also illustrates the complexities involved in tracking a data storage path for a particular Input/Output (I/O) data packet. As mentioned above, the SAN 102, like the LAN 130 and Internet 122, is illustrated as a nebulous cloud because the hardware and software components of the SAN 102 are so interconnected that many paths exist from one side of the SAN 102 to the other. As mentioned, the SAN 102 may include a variety of routers, switches, hubs, host bus adapters, and the like connected to storage servers executing on the host 118 or computers 126, 104. The many hardware devices include a variety of subsystems and ports on the devices, systems, and subsystems. For example, the typical switch will include about 32 switch ports. The interconnected SAN devices provide redundancy that ensures that a storage data packet is successfully delivered to the destination, even if there are failures of components within the SAN 102. As used herein, the term "SAN component" means any hardware or software device, system, or subsystem, virtual or physical, that is found within, or connected to, members of the SAN 102 including switches, servers, applications, routers, tape libraries, storage devices, host bus adapters, array controllers, and the like associated with a SAN 102.

A data storage path is a collection of SAN components that initiate, complete, or participate in the transfer of a storage data message between a source and a destination. Referring to FIG. 1, an example data storage path may include an application (not shown) executing on the personal computer 126 that sends a data storage write message to data storage device 112. The example data storage path includes the port of the personal computer through which the write message passes as well as the routers and/or switches (not shown), and the ports thereof, within the LAN 130 that transfer the write message. The example data storage path may further include the host 118, ports on the host 118 and host bus adapters (not shown) managed by the host 118. The example data storage path may further include the SAN 102, ports on the switches in the SAN 102, and ports and volumes of a storage subsystem or storage controller connected to the SAN 102.

Consequently, a single data storage path typically includes a large number of devices, ports, firmware, software and the like. The SAN components of the data storage path are physically connected and may also be logically associated with other SAN components, for example, in a SAN zone. As used herein, "physically connected" and a "physical connection" includes a direct communication link between a source SAN component and a destination SAN component. The direct communication link may be wired or wireless.

The SAN 102 may be physically or logically divided into zones (not shown). SAN components within a SAN zone may not be directly involved a particular data storage path, but could be involved in a subsequent data storage path from the same source application or device. These SAN components are referred to herein as being "logically connected."

A zone comprises a collection of SAN components, switches, ports, and the like organized into a physically and/or logically separated group within a SAN 102. The zone may be organized based on a variety of criteria such as the entry and exit points in to and out of the SAN 102, the number and/or types of switches within the SAN, the priority of the users of certain devices in the SAN 102, and the like. Zoning may be performed for security purposes, for resource sharing, to facilitate access, to enhance performance, and the like. Each member of the zone is logically connected to each other SAN component member. Two ports on a single switch may belong to different SAN zones.

Figure 2:
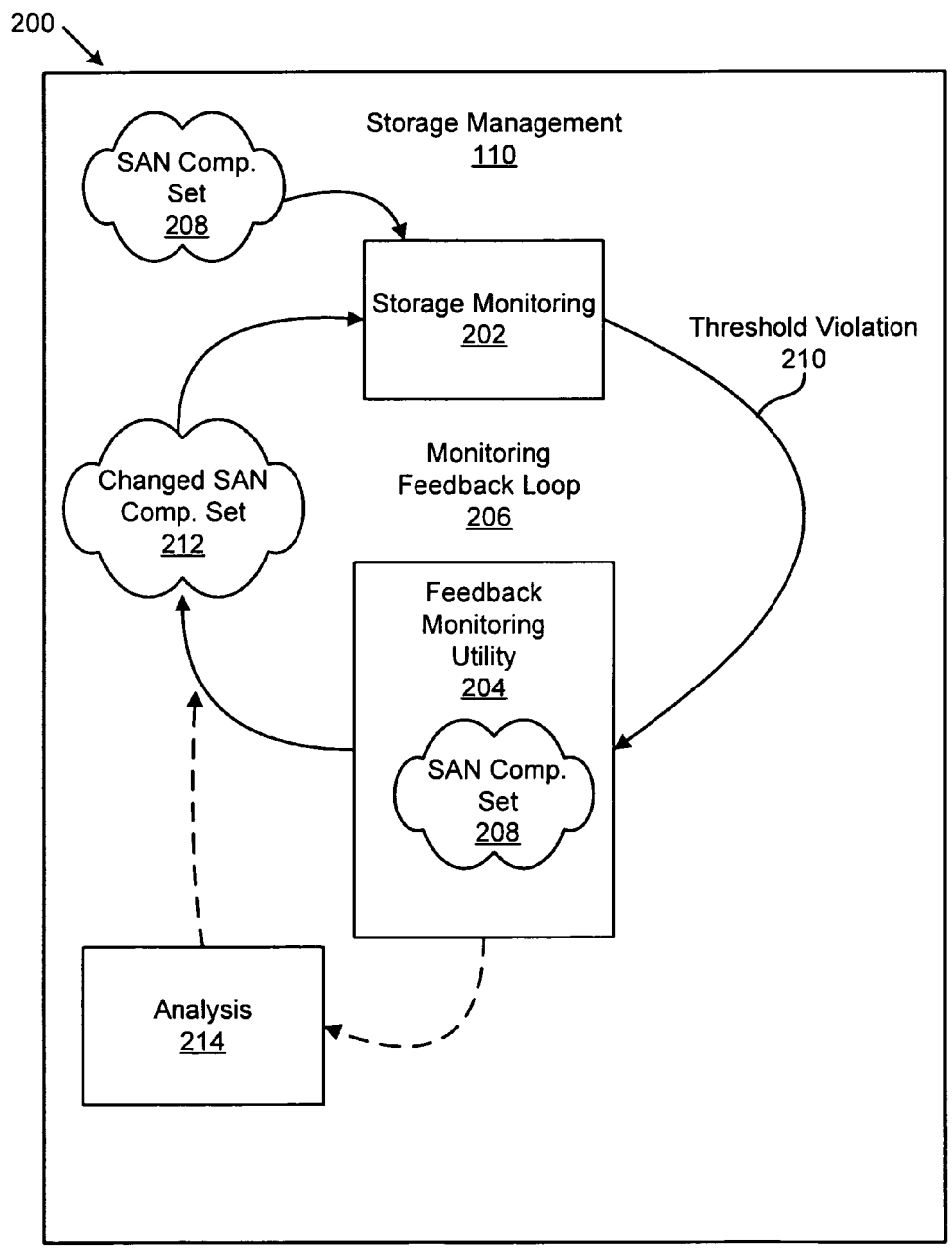
FIG. 2 is a schematic block diagram illustrating one embodiment of a system for dynamically determining a set of SAN components for performance monitoring.

FIG. 2 illustrates a system 200 for dynamically determining a set of SAN components for performance monitoring. As used herein, the term "dynamically" means that the associated functionality is performed without the aide, input, assistance, or commands issued by a user, operator, or the like. Advantageously, the system 200 dynamically adjusts the set attributes of a set of SAN components involved in performance monitoring, as well as dynamically determining attributes of the set. The system 200 includes a storage management module 110, a storage monitoring module 202, and a feedback monitoring utility 204. The system 200 is configured to dynamically determine which SAN components to include in a set of SAN components being monitored for performance. Advantageously, the system 200 implements a monitoring feedback loop 206 such that the set of SAN components being monitored changes dynamically.

The storage management module 110 in one embodiment is configured to communicate with and direct operation of a plurality of SAN components within a SAN 102. One example of a storage management module 110 suitable for use with the present invention is the TotalStorage® Productivity Center (TPC) available from IBM of Armonk, N.Y. The storage management module 110 includes a wide range of management functions to facilitate organization, operation, utilization, availability, planning, and performance of the SAN 102. Those of skill in the art will recognize that the storage management module 110 may include more or fewer modules in order to perform all of its management functions and that certain functional modules have been omitted to clarify the aspects and modules of the present invention.

The storage monitoring module 202 monitors the performance of certain SAN components in the SAN 102. In one embodiment, the storage monitoring module 202 is configured to monitor a predefined set of SAN components 208. A typical SAN 102, such as in an enterprise, may include hundreds or thousands of SAN components that are capable of being monitored for performance. Monitoring a predefined set of SAN components 208 is advantageous because the volume of data collected and monitored may be reduced to manageable levels. The predefined set of SAN components 208 may include a single SAN component. Of course the predefined set of SAN components 208 may also include all SAN components of a SAN 102 or a subset of SAN components of a SAN 102.

In one embodiment, the storage monitoring module 202 includes a variety of monitoring functions that are configured, initiated, reset, and/or triggered based on monitoring configuration data associated with each SAN component that is monitored. Monitoring configuration data defines the type of SAN component activity to be monitored as well as the boundaries for that type of SAN component activity.

In one embodiment, a monitor data structure stores the monitoring configuration data. Those of skill in the art recognize that the monitor data structure may have various forms, formats, and configurations. For example, the monitor data structure may comprise an object, a record, a file, a table, an array, a linked list, or the like in persistent or nonpersistent storage.

In one embodiment, a single monitor data structure relates to a single SAN component. The storage monitoring module 202 uses the monitoring configuration data to initiate a monitoring service relating to the associated SAN component. The monitoring service may monitor a variety of characteristics pertaining to each SAN component, such as the data I/O throughput, I/O efficiency, I/O errors, I/O integrity errors, I/O availability, I/O utilization rates, storage capacity, storage utilization rate, and the like.

Each monitored characteristic may include a threshold value or setting. When I/O activity on the monitored SAN component crosses the threshold value or setting either by increasing or decreasing, the event is detected by the storage monitoring module 202 as a threshold violation 210. In certain instances, the threshold value or setting may simply comprise satisfaction of the monitoring criteria. In other words, a single occurrence of a monitored condition (i.e. device offline) may trigger a threshold violation 210. A threshold violation 210 simply indicates that a monitored characteristic has crossed a threshold. Whether a threshold violation 210 is a problem or not, depends on the context. Typically, due to the dynamic nature of the SAN, the threshold violations 210 occur at different rates for different SAN components and are affected by the types of operations passing between the applications, storage servers, and storage devices 112.

In one embodiment, the predefined set of SAN components 208 is defined manually by a user such as a system administrator. Alternatively, the storage management module 110 is configured to automatically generate the set of SAN components 208. For example, in response to user input or an undefined SAN component set 208 the storage management module 110 or storage monitoring module 202 may automatically scan the SAN for SAN components. SAN scan results may comprise identifiers of SAN components used to define the predefined set of SAN components. All or a subset of the SAN components in the SAN scan results may be included in the predefined set 208. In another embodiment, the user modifies an automatically generated set of SAN components to define the predefined set of SAN components 208.

The predefined set of SAN components, also referred to herein as "SAN component set" or "set of SAN components," is a set of SAN components that are designated for performance monitoring by the storage monitoring module 202. In one embodiment, the predefined set of SAN components 208 is a collection of monitor data structures, each monitor data structure associated with each SAN component. The storage monitoring module 202 may populate the monitor data structure automatically or with the assistance of a user using for example a user interface.

In an alternative embodiment, the predefined set of SAN components 208 comprises identifiers for the SAN components to be monitored. The identifiers may be used to retrieve the details of how each SAN component is to be monitored and/or to interrogate the SAN components for the relevant monitoring information. Those of skill in the art will recognize other ways the predefined set of SAN components 208 may be implemented.

Typically, a threshold violation 210 includes details about the violation context such as a timestamp of the violation, identifier of the SAN component responsible, and the like. This violation information may be stored in a data structure. The storage monitoring module 202 may signal the feedback monitoring utility 204 of the threshold violation 210 by passing a data structure with the violation details, or a pointer thereto.

The feedback monitoring utility 204 changes an attribute of the set of SAN components 208 in response to a threshold violation 210. In addition, the feedback monitoring utility 204, in one embodiment, directs the storage monitoring utility 202 to monitor SAN components of the changed SAN component set 212. Advantageously, the SAN components of the changed SAN component set 212 are then monitored in place of the predefined set of SAN components 208.

The ability of the feedback monitoring utility 204 to change attributes of the predefined set of SAN components 208 based on at least one threshold violation 210 defines the monitoring feedback loop 206. The monitoring feedback loop 206 enables the set of SAN components 208 being monitored to be modified dynamically in response to how the SAN 102 is actually being used. The changed SAN component set 212 then continues to cycle through the monitoring feedback loop 206 until the process is interrupted by halting performance monitoring or by user intervention. Depending on the analysis criteria and the nature of threshold violations 210, cycles of the changed SAN component set 212 may or may not result in any changes to the attributes of the changed SAN component set 212.

The feedback monitoring utility 204 may change a variety of attributes of the SAN component set 208 including removing SAN components as members of the set 208, changing the monitoring attributes of current members of the SAN component set 208, adding SAN components as members of the set 208, and the like. In one embodiment, the feedback monitoring utility 204 applies violation analysis criteria to the threshold violation 210. The violation analysis criteria may be user defined and configurable. Violation analysis criteria defines the type of change(s) to be made to a particular attribute of the SAN component set 208 in response to a threshold violation 210. Violation analysis criteria may relate to a certain type of threshold violation 210, historical information relating to the threshold violation 210, and the like.

For example, the SAN component set 208 may include sixteen switches and their associated ports. The violation analysis criteria may indicate that if a threshold violation 210 occurs for a switch port within a specific switch, the feedback monitoring utility 204 changes the membership of the set 208 such that the changed SAN component set 212 includes only the specified switch and ports on the specified switch. Because the changed SAN component set 212 now includes a single switch and its ports, the monitoring task for the storage monitoring module 202 is greatly reduced (from sixteen switches and ports down to one).

In addition or alternatively, the feedback monitoring utility 204 may include violation analysis criteria causing the feedback monitoring utility 204 to add, to the SAN component set 208, SAN components connected to the SAN component responsible for the threshold violation 210. In this manner, the changed SAN component set 212 input to the storage monitoring module 202 may grow to include other potentially problematic SAN components. The feedback monitoring utility 204 may access and change the SAN component set 208 directly to form the changed SAN component set 212. By changing attributes of the SAN component set 208, the feedback monitoring utility 204 dynamically changes the monitoring feedback loop 206 to restrict, expand, or shift the focus of storage performance monitoring performed by the storage monitoring module 202.

In one embodiment, the feedback monitoring utility 204 passes the changed SAN component set 212 to an analysis module 214 prior to feeding the changed SAN component set 212 into the storage monitoring module 202. Alternatively, the feedback monitoring utility 204 passes a copy of the changed SAN component set 212 to the analysis module 214. In another embodiment, where the feedback monitoring utility 204 has added SAN components connected to the SAN component responsible for the threshold violation 210, the feedback monitoring utility 204 may pass just the responsible SAN component or just the SAN components physically connected to the responsible SAN component to the analysis module 214.

The analysis module 214 performs an analysis of the members of the changed SAN component set 212 using SAN component analysis criteria. Alternatively, the analysis module 214 performs an analysis of the members of the changed SAN component set 212 marked by the feedback monitoring utility 204 based on historical monitoring information. The historical monitoring information may include for example a tally of threshold violations 210 for a particular SAN component, a threshold violation frequency, or the like.

In one embodiment, the analysis module 214 performs an analysis relevant to the one or more SAN components responsible for the threshold violation 210 using SAN component analysis criteria. The SAN component analysis criteria may relate specifically to a particular SAN component or type of SAN component. The SAN component analysis criteria may include additional tests or queries that are performed in relation to the SAN components received from the feedback monitoring utility 204. Based on the results of applying the SAN component analysis criteria, the analysis module 214 takes action or triggers a suitable response.

In one embodiment, the analysis module 214 may issue a notification to alert system administrators of a potential problem. In another embodiment, the analysis module 214 may further reduce or expand the SAN component membership within the changed SAN component set 212. In another embodiment, the results of the SAN component analysis criteria may indicate that no action be taken. Those of skill in the art will recognize a variety of other actions and/or responses that the analysis module 214 may trigger in response to the results of the SAN component analysis criteria.

Figure 3:
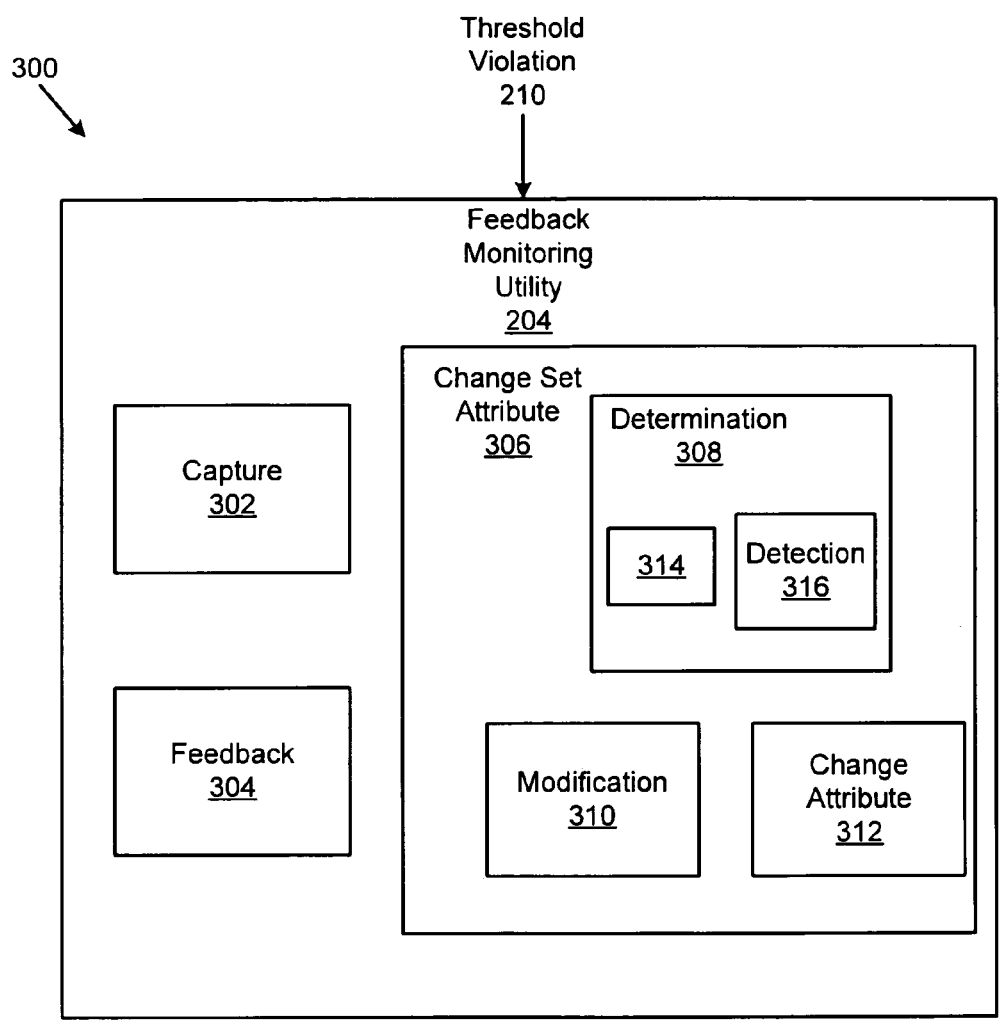
FIG. 3 is a schematic block diagram illustrating one embodiment of a feedback monitoring utility for dynamically determining a set of SAN components for performance monitoring.

FIG. 3 is a schematic block diagram illustrating one embodiment of an apparatus 300 for dynamically determining a set of SAN components for performance monitoring. The apparatus 300 includes a feedback monitoring utility 204 that receives a threshold violation 210 and functions substantially the same as described in relation to FIG. 2. The feedback monitoring utility 204 includes a capture module 302, a feedback module 304, and a change set attribute module 306.

The capture module 302 receives the threshold violations 210 from the storage monitoring module 202. In one embodiment, the threshold violations 210 are a set of data organized into a threshold violation data structure received and processed by the capture module 302. The threshold violation data structure includes information such as the timestamp for the threshold violation, identifiers for the SAN device and/or SAN component, the type of threshold violated, the time interval over which data has been collected, and the like. In another embodiment, information stored in a threshold violation data structure may be combined into a monitor data structure associated with each SAN component.

In certain embodiments, the storage monitoring module 202 sends all threshold violations 210 for the SAN component set 208 or the changed SAN component set 212 to the capture module 302. The captures module 302 may queue the threshold violations 210. Queuing threshold violations 210 may be advantageous where the feedback monitoring utility 204 operates periodically to reduce the overhead in monitoring that repeated changes to the changed SAN component set 212 may cause.

The feedback module 304 causes the storage monitoring module 202 to monitor the SAN components of the changed SAN component set 212. Those of skill in the art recognize a variety of ways the feedback module 304 may direct the storage monitoring module 202 to use the changed SAN component set 212 as input or in place of the predefined SAN component set 208. For example, the feedback module 304 may change a data structure or repository that defines the predefined SAN component set 208 directly. In one embodiment, changing the predefined SAN component set 208 may involve adding or removing monitor data structures that are related to SAN components that are to be added or removed from the predefined SAN component set 208. The monitor data structures for newly added SAN components may be predefined or populated with default baseline monitoring configuration data. Alternatively, the feedback module 304 generates a new set that represents the changed SAN component set 212.

The change set attribute module 306 changes an attribute of the predefined SAN component set 208 or a changed SAN component set 212 based on the threshold violation 210. In certain embodiments, the presence of a threshold violation 210 of a particular type may cause the change set attribute module 306 to dramatically change the SAN component membership within the changed SAN component set 212. Alternatively, the change set attribute module 306 may perform further analysis. Based on the results of this further analysis, other attributes of the changed SAN component set 212 may be changed, as explained below.

The change set attribute module 306 includes a determination module 308, a modification module 310, and a change attribute module 312. The change set attribute module 306 determines what type of attribute change to make to the predefined or changed SAN component set 208, 212. In one embodiment, the determination module 308 applies SAN component analysis criteria in response to a received threshold violation 210.

The SAN component analysis criteria may comprise a set of conditions. An administrator may configure these conditions. In one embodiment, the analysis conditions determine whether current SAN component members of the predefined or changed SAN component set 208, 212 are retained within the set 208, 212. In another embodiment, the change set attribute module 306 may apply a set of violation analysis criteria to determine set membership. Certain other SAN component analysis criteria may control further analysis and response as discussed above in relation to the optional analysis module 214.

In one embodiment, the change set attribute module 306 determines that SAN components connected to the SAN component responsible for the threshold violation 210 are to be added to the changed SAN component set 212. In another embodiment, the change set attribute module 306 makes this determination based on SAN component analysis criteria. The change set attribute module 306 employs the determination module 308 to identify and add SAN components connected to the SAN component responsible for the threshold violation 210.

The determination module 308 cooperates with the modification module 310 to include more SAN components in the changed SAN component set 212. In one embodiment, the determination module 308 uses the monitor data structure to identify the SAN component responsible for the threshold violation 210. Alternatively, the determination module 308 may use a threshold violation data structure for identification purposes.

Once the SAN component responsible for the threshold violation 210 is identified, the determination module 308 may use a variety of techniques to determine which SAN components are connected to the responsible SAN component. In one embodiment, the determination module 308 references a connectivity data structure 314 associated with the responsible SAN component. The connectivity data structure 314 may comprise a record, a file, a table, or the like. The connectivity data structure 314 may be predefined and stored in a repository or generated as needed and stored for future reference. The connectivity data structure 314 comprises a mapping from a responsible SAN component to each other SAN component that is connected to the responsible SAN component. An example of a connectivity data structure 314 according to one embodiment is described below in relation to FIG. 4B.

In one embodiment, the connectivity data structure 314 indicates SAN components that are both physically connected and logically connected to the SAN component responsible for the threshold violation 210. As defined above, physically connected SAN components have a direct connection whereas logically connected SAN components may be involved in a data storage path because they are members of the same SAN zone as the responsible SAN component.

Alternatively, the connectivity data structure 314 may not provide sufficient information to identify logically connected SAN components. Consequently, the determination module 308 may cooperate with a detection module 316 to identify logically connected SAN components. The detection module 316, in one embodiment, queries SAN components to determine which SAN components are logically connected to the SAN component responsible for the threshold violation 210. Alternatively, the detection module 316 queries a repository that holds SAN zone membership information. In another embodiment, the detection module 316 queries other storage management modules configured to manage SAN zone information. The detection module 316 may issue the queries as needed, or during a SAN connectivity discovery phase.

Once the determination module 308 identifies connected SAN components to the SAN component responsible for the threshold violation 210, the modification module 310 modifies the predefined or changed SAN component set 208, 212 to include at least one of the determined connected SAN components. In one embodiment, adding connected SAN components may comprise retrieving or defining monitor data structures for each connected SAN component. The monitor data structures may be predefined within a repository or defined using defaults for the threshold type, data collection interval, and the like.

In one embodiment, the modification module 310 includes all of the connected SAN components identified by the determination module 308. Alternatively, the modification module 310 adds a select number of the connected SAN components identified by the determination module 308 to the predefined or changed SAN component set 208, 212. For example, the modification module 310 may add two additional connected SAN component to the SAN component set 208, 212 for each instance a threshold violation 210 is received for the responsible SAN component.

Within a SAN 102, cause and effect relationships are not always readily apparent. A threshold violation 210 from a particular SAN component may not be caused by a problem with that SAN component. Instead, the cause may be another SAN component connected to the particular SAN component. Advantageously, the determination module 308 and modification module 310 allow for the set of SAN components 212 being monitored to change dynamically to expand the scope of monitoring to SAN components that may provide context for the threshold violation 210. In certain embodiments, the determination module 308 may use historical monitoring information to determine to remove connected SAN components of a SAN component set 208, 212.

In addition, the determination module 308 adds SAN components that are connected to the SAN component responsible for the threshold violation 210 rather than all the SAN components in the SAN 102. In this manner, the challenges of collecting and analyzing large volumes of data are avoided. The feedback monitoring utility 204 selectively shifts the monitoring focus to the area (set of SAN components) of the SAN 102 most likely to facilitate detection and resolution of SAN component performance problems.

In one embodiment, the change set attribute module 306 may alter one or more attributes of one or more monitor data structures that are members of the set of SAN components 208, 212 based on the threshold violation 210. The change set attribute module 306 may include criteria and/or rules for determining which attributes of a monitor data structure to alter and by what amount. The criteria may indicate that no change is to be made. Alternatively, the monitor data structure may include attributes that indicate what attributes the change set attribute module 306 should change and by what factor. Those of skill in the art will recognize a variety of monitor data structure attributes that may be altered by the change set attribute module 306.

In one embodiment, the change set attribute module 306 cooperates with the change attribute module 312. The change attribute module 312 is configured to retrieve and manipulate the values for the attributes or fields of the monitor data structures in accordance with how the monitor data structures are implemented. In one embodiment, the change attribute module 312 may issue method calls to an object representing the monitor data structure. In another embodiment, the change attribute module 312 may issue write commands to a database or file storing the monitor data structure.

By changing monitor attributes of the monitor data structures of SAN components in the set of SAN components 208, 212 and feeding these monitor data structures back into the storage monitoring module 202, the process of performance monitoring of SAN components is effectively and dynamically tuned with each pass of a monitor data structure through the monitoring feedback loop 206. For example, in one embodiment, the change attribute module 312 changes a threshold attribute such that the frequency of threshold violations changes. A threshold attribute is a value that defines a boundary for a monitored characteristic of a SAN component. When the value for the monitored characteristic rises above, or falls below, the value of the threshold attribute, there may be a problem. Examples of attributes relating to monitoring of a SAN component which the change attribute module 312 may change include data collection frequency, threshold attribute levels, and the like.

A typical example monitored characteristic may be Data throughput rate. The threshold attribute may be 200 megabytes per second. A threshold violation 210 occurs when the Data throughput rate exceeds 200 megabytes per second. Based on the threshold violation 210 and, in certain embodiments, rules relating to threshold attribute changes, the change attribute module 312 changes the threshold attribute for Data throughput rate by incrementing the threshold attribute a fixed amount, such as by ten megabytes. Of course, the fixed amount may be user-defined and/or configurable and may be retrieved from the monitor data structure. Alternatively, the change attribute module 312 may decrement threshold attribute for Data throughput rate by a fixed amount.

In this manner, the monitoring sensitivity for this particular SAN component is dynamically adjusted. By increasing a threshold attribute, the number of future threshold violations 210, for this SAN component, is decreased. By decreasing a threshold attribute, the number of future threshold violations 210, for this SAN component, is increased, and vice versa. In other words, these adjustments change the frequency of threshold violations for a particular SAN component.

Figure 4A:
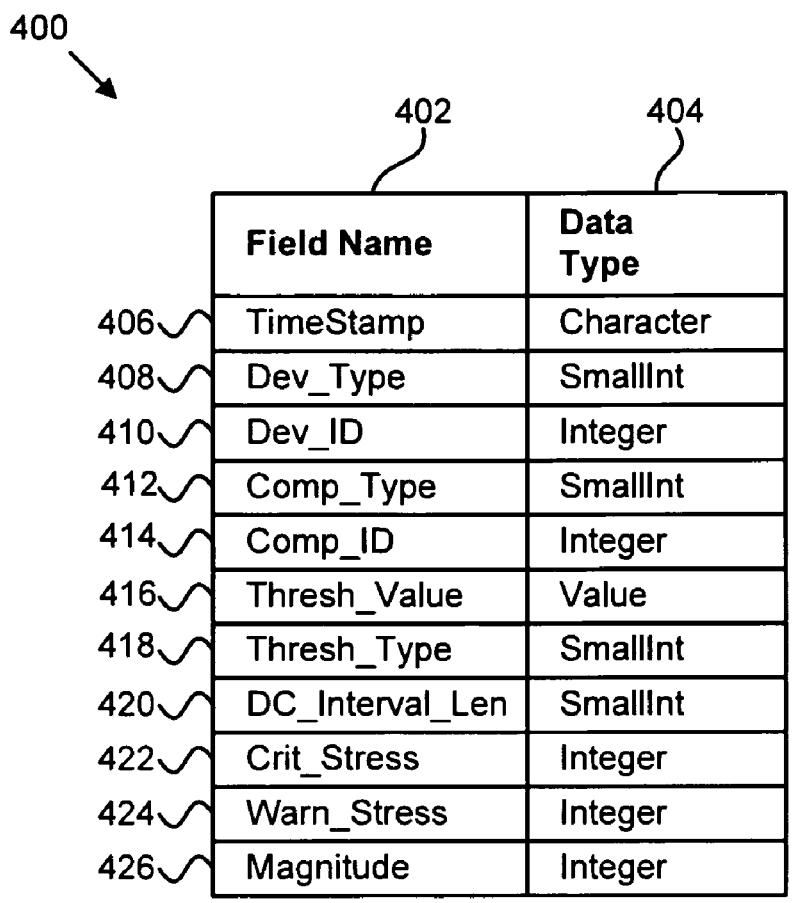
FIG. 4A is a schematic block diagram illustrating one embodiment of a data structure suitable for use in a method for dynamically determining a set of SAN components for performance monitoring.

FIG. 4A illustrates one embodiment of a data structure 400 suitable for use in a method for dynamically determining a set of SAN components for performance monitoring. In one embodiment, the data structure 400 is configured to hold fields relating both a monitor data structure and a threshold violation data structure. Alternatively, the fields of the monitor data structure and threshold violation data structure are stored and passed in separate data structures.

The example data structure 400 includes fields 402 that hold data of a predefined type 404. The data structure 400 may include a TimeStamp field 406, Dev_Type field 408, Dev_ID field 410, Comp_Type field 412, and Comp_ID field 414. The TimeStamp field 406 may hold a time value representative of when a threshold violation occurs. The TimeStamp field 406 may comprise a plurality of fields to capture the time according to SAN component device clocks, the time according to SAN server clocks, and/or the universal time code. In another embodiment, a second TimeStamp field(s) 406 may be included to represent the time that monitoring of the SAN component associated with the example data structure 400 began. The data type 404 for the TimeStamp field 406 may be a character type.

The Dev_Type field 408 and Comp_Type field 412 represent the type of SAN device and the type of SAN component, respectively. As explained above, a SAN component monitored for performance may be a SAN hardware device, a SAN software or firmware module, or an individual physical or virtual port of a SAN device. The SAN device type and SAN component type facilitate identifying which type of SAN component is being monitored.

The Dev_ID field 410 and Comp_ID field 414 hold identifier values to uniquely identify a SAN device within a type of SAN devices and a Component device within a type of SAN components, respectively. As explained above, a SAN 102 may include hundreds or thousands of SAN devices and SAN components of a particular type. The SAN device ID and SAN component ID allow a particular SAN component to be identified such that an action can be taken.

The data structure 400 may include a Thresh_Value field 416, Thresh_Type field 418, a DC_Interval_Len field 420, a Crit_Stress field 422, a Warn_Stress field 424, and a magnitude field 426. The Thresh_Value field 416 may hold a value representative of the threshold attribute for the SAN component. The value of a monitored characteristic is stored in the Magnitude field 426. The Thresh_Type field 418 identifies the type of threshold being monitored. Example threshold types may include throughput, error rate, storage capacity, storage utilization, and the like. The DC_Interval_Len field 420 stores a time interval for data collection from the associated SAN component. In one embodiment, once the DC_Interval_Len time interval expires, the storage monitoring module 202 queries the SAN component for an updated magnitude field value. The change attribute module 312 may adjust the value of the Thresh_Value field 416 and/or the DC_Interval_Len field 420, as needed.

The Crit_Stress field 422 and Warn_Stress field 424 may comprise flag values that represent a severity level for the threshold violation 210. If the Crit_Stress field 422 is set, the severity of the threshold violation is high. If the Warn_Stress field 424 is set, the severity of the threshold violation is nominal. Values in the Crit_Stress field 422 and Warn_Stress field 424 may factor into the changes made by the change set attribute module 306. The data types 404 for the fields may be as set forth in FIG. 4A.

Those of skill in the art recognize that different data types 404 and additional or fewer data fields 402 may be used in different embodiments. Advantageously, the example data structure 400 includes sufficient information to identify the monitored SAN component, identify the time the threshold violation occurs, and adjust the sensitivity of the threshold monitoring.

Figure 4B:
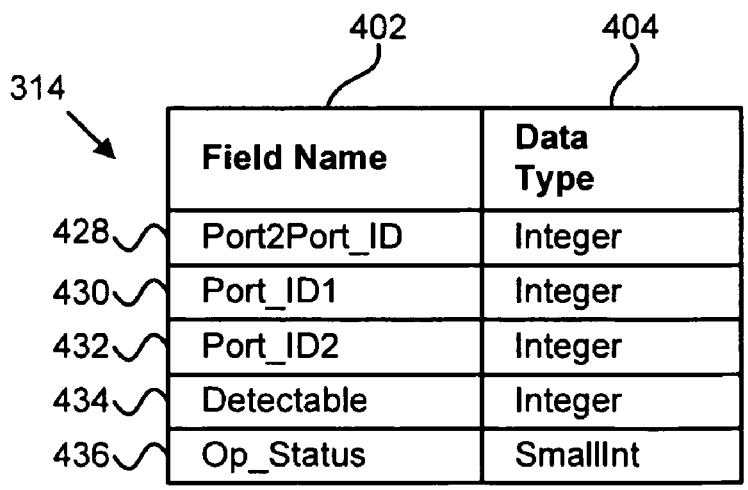
FIG. 4B is a schematic block diagram illustrating one embodiment of a data structure suitable for use in a method for dynamically determining a set of SAN components for performance monitoring.

FIG. 4B illustrates one embodiment of a data structure suitable for use in a method for dynamically determining a set of SAN components for performance monitoring. FIG. 4B illustrates one example of a connectivity data structure 314 suitable for use by the determination module 308 to determine one or more SAN components connected to a SAN component responsible for the threshold violation 210. The connectivity data structure 314 may include a Port2Port ID field 428, a Port_ID1 field 430, a Port_ID2 field 432, a Detectable field 434, and an Op_Status field 436.

The Port2Port ID field 428 serves as an index field for locating connected ports within the SAN. The Port_ID1 field 430 and Port_ID2 field 432 serves as identifiers of the ports on either side of a SAN connection between SAN components. This connection may be physical or logical. The values in the Port_D1 field 430 and/or Port_ID2 field 432 correspond to the Comp_D values in the Comp_ID field 414. By successively scanning the connectivity data structure 314 the determination module 308 can identify SAN components connected to the SAN component responsible for the threshold violation. Determining connected SAN components enables the feedback monitoring utility 204 to change membership of the changed SAN component set 212 such that threshold violations 210 can be dynamically monitored in the context of connected SAN components.

The Detectable field 434 may identify whether performance monitoring for the SAN component identified in the Port_ID1 field 430 is possible. If not, the SAN component identified in the Port_ID1 field 430 may not be considered a "connected" SAN component. The Op_Status field 436 may include a flag value indicating whether the SAN component identified in the Port_ID1 field 430 is operational. If not, the SAN component identified in the Port_ID1 field 430 may not be considered a "connected" SAN component.

Figure 5:
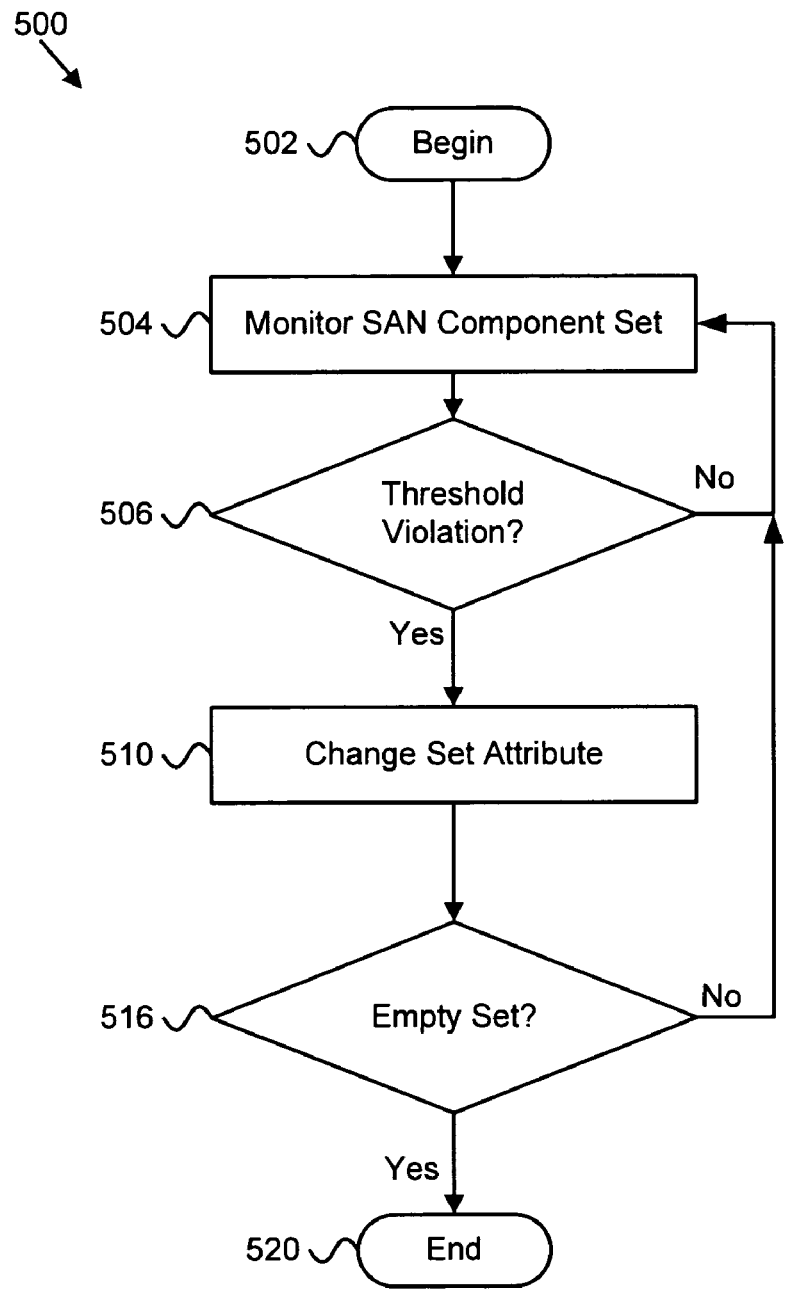
FIG. 5 is a schematic flow chart diagram illustrating another embodiment of a method for dynamically determining a set of SAN components for performance monitoring.

FIG. 5 illustrates one embodiment of a method 500 for dynamically determining a set of SAN components for performance monitoring. Advantageously, the method 500 dynamically adjusts attributes of the set of SAN components, the attributes including the members of the set and the monitor attributes of one or more members of the set. The method 500 begins 502 and the storage monitoring module 202 begins monitoring 504 SAN components within a SAN component set. On an initial pass through the monitoring feedback loop 206, the SAN component set comprises the predefined set of SAN components 208. On subsequent passes through the monitoring feedback loop 206, the SAN component set comprises the changed SAN component set 212.

Next, a feedback monitoring utility 204 may determine 506 whether a threshold violation 210 occurs. If not, the storage monitoring module 202 continues monitoring 504. If a threshold violation 210 occurs, the feedback monitoring utility 204 changes 510 a set attribute of the SAN component set 208. In once instance, the feedback monitoring utility 204 may make a minor change such as simply recording that a threshold violation 210 has occurred for a SAN component in order to begin gathering historical monitoring information. In another instance, the feedback monitoring utility 204 may make a major change such as adding or removing SAN component connected to the SAN component responsible for the threshold violation 210.

Once one or more set attributes of the SAN component set 208 (or changed SAN component set 212 on a subsequent pass) are changed, the feedback module 304 determines 516 whether the SAN component set 208, 212 are empty. If so, the method 500 ends 520 because no SAN components are currently being monitored. If the SAN component set 208, 212 is not empty, the feedback module 304 feeds the changed SAN component set 212 into the storage monitoring module 202.

Figure 6:
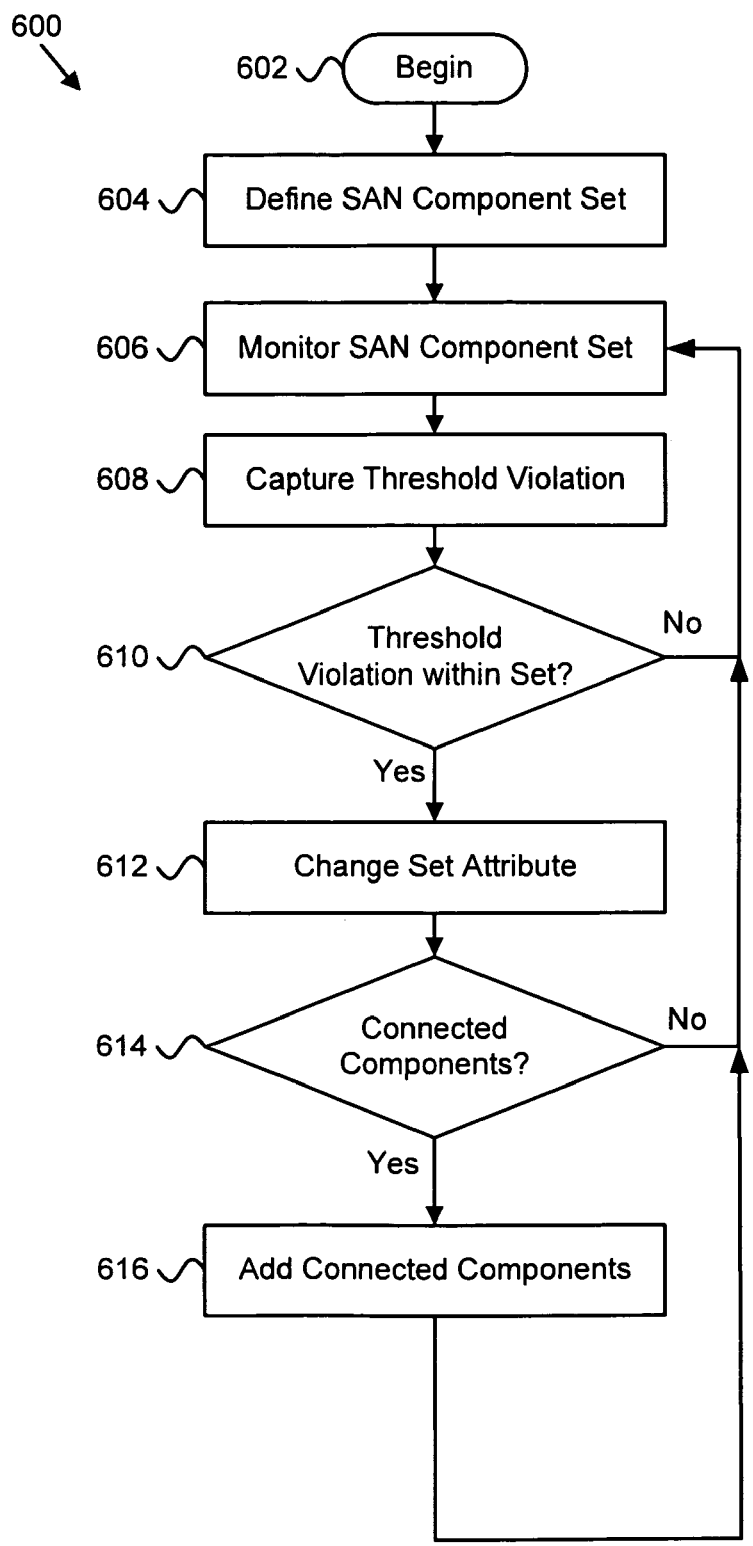
FIG. 6 is a schematic flow chart diagram illustrating one embodiment of a method for dynamically determining a set of SAN components for performance monitoring.

FIG. 6 illustrates another embodiment of a method 600 for dynamically determining a set of SAN components for performance monitoring. The method 600 begins 602 and the storage management module 110 automatically defines 604 a SAN component set 208 that is initially provided to the storage monitoring module 202. The storage management module 110 may employ the feedback monitoring module 204 to automatically define the SAN component set 208.

Those of skill in the art will recognize that the feedback monitoring module 204 may include an optional scanning module (not shown) configured to interrogate the SAN components within the SAN connected to the feedback monitoring module 204. Based on the interrogation, the identities of SAN components within the SAN 102 can be determined. The feedback monitoring module 204 may define a monitor data structure for each SAN component having a SAN component identity. Alternatively, the storage management module 110 may execute other existing scanners to identify the SAN components for the SAN component set 208. In another embodiment, the storage management module 110 may collect SAN component identification information earlier and record the information in a repository accessible to the storage monitoring module 202.

In addition, the size and number of SAN components within the set 208 may vary depending on the embodiment, and potentially on policy rules for the storage management module 110 defined by an administrator. For example, in one embodiment, the SAN component set 208 initially contains a single SAN component. In another embodiment, the SAN component set 208 initially contains all SAN components discovered by a SAN scanning module. Alternatively, the SAN component set 208 initially contains a SAN component within one or more SAN zones. Advantageously, from a relatively small number of SAN components the SAN component set 208 can grow automatically. In one embodiment, a user operating the storage management module 110 may edit the automatically defined SAN component set 208.

Next, the storage monitoring module 202 begins monitoring 606 SAN components within the SAN component set 208. The capture module 302 may capture 608 the threshold violations 210 for substantially the whole SAN 102. The capture module 302 may then determine 610 whether a captured threshold violation 210 is associated with a SAN component identified within the SAN component set 208. If not, the capture module 302 may ignore the threshold violation 210. If so, the capture module 302 may communicate the threshold violation 210 and/or the associated monitor data structure to the change set attribute module 306.

The change set attribute module 306 may change 612 one or more set attributes of the SAN component set 208 based on the threshold violation 210. As mentioned, in certain passes through the monitoring feedback loop 206, the violation analysis criteria and/or SAN component analysis criteria may indicate that no change should be made to any attributes of the SAN component set 208, 212.

Next, a determination module 308 determines 614 whether there are SAN components connected to the SAN component responsible for the threshold violation 210 and whether these connected SAN components are members of the SAN component set 208, 212. If there are connected SAN components not currently in the SAN component set 208, 212, the modification module 310 adds 616 the connected SAN components to the SAN component set 208, 212. If not, or if connected SAN components are added 616, the feedback module 304 sends the changed SAN component set 212 as input to the storage monitoring module 202. The method 600 may terminate in response to user input or if the change set attribute module 306 removes SAN components such that the changes SAN component set 212 is empty.

Figure 7:
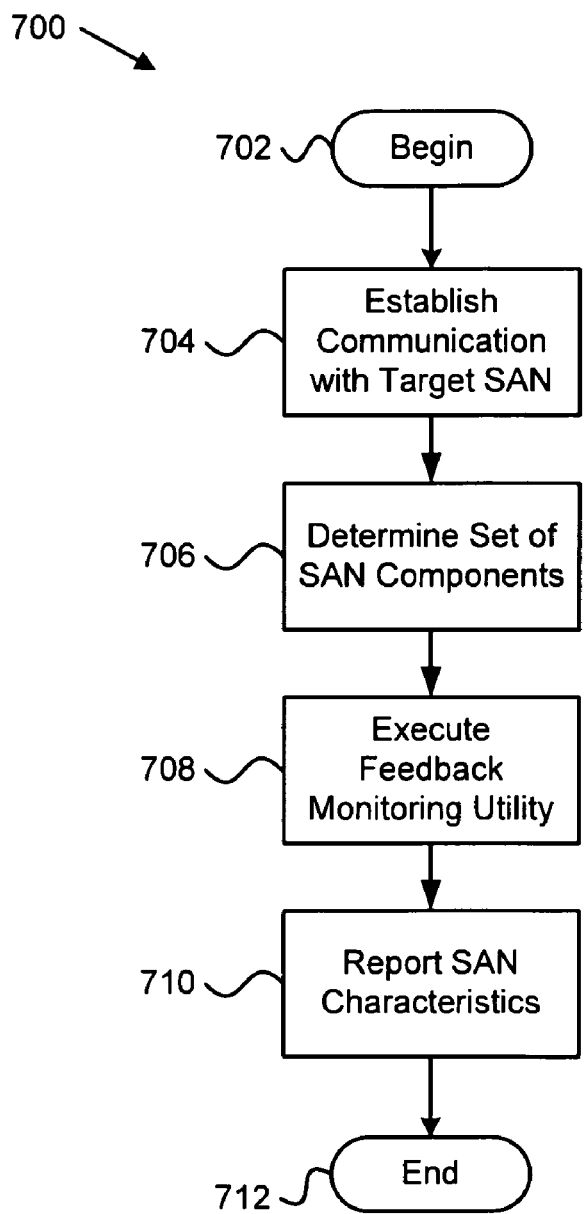
FIG. 7 is a schematic flow chart diagram illustrating one embodiment of a method for dynamically determining a set of SAN components for performance monitoring.

FIG. 7 illustrates one embodiment of a method 700 for dynamically determining a set of SAN components for performance monitoring. In particular, the method 700 may be practiced by a user having an embodiment of the feedback monitoring utility 204. The user may or may not own the SAN 102 or the SAN components. However, the user may operate the feedback monitoring utility 204 to provide valuable information to the owner of the SAN 102 and/or SAN components in order to provide a service.

The method 700 begins 702 with establishment 704 of a communication link between a feedback monitoring utility 204 and a target SAN. The communication link is established such that threshold violations 210 are received by the feedback monitoring utility 204. Monitoring of SAN components within a set of SAN components may be performed by other SAN management utilities. The feedback monitoring utility 204 may be given access to the target SAN through use of a direct connection, a login account, a wireless connection or the like. Alternatively, the communication link may comprise a remote communication link between the feedback monitoring utility 204 and the target SAN. The target SAN is the SAN having components that are to be monitored to determine a performance monitoring set.

Next, a determination 706 is made as to which SAN components will be members of the SAN component set 208. This may be done using user input, automated tools, or a combination of these. Next, the feedback monitoring utility 204 is executed 708 and begins receiving threshold violations 210 that occur on the target SAN. In one embodiment, the feedback monitoring utility 204 is executed for a sufficient time period that the SAN component set 208 is changed at least once into a changed SAN component set 212 that feeds back into a storage monitoring module 202. The feedback monitoring utility 204 may execute for hours, days, weeks, or the like.

Either during, or after, execution of the feedback monitoring utility 204, the method 700 continues by reporting 710 on SAN characteristics of the target SAN. A variety of SAN characteristics may be reported including SAN components involved in SAN bottlenecks, SAN components that are being under utilized, SAN components approaching storage capacity limits, and the like. Once SAN characteristics are reported the method 700 ends 712.

In one embodiment, the feedback monitoring utility 204 analyzes SAN components of the changed set based on SAN component analysis criteria and responds based on results of the SAN component analysis criteria. The response may include sending certain SAN components for more detailed analysis. Another response may be removing one or more SAN components from the SAN component set 208.

Advantageously, the present invention provides an apparatus, system, and method that dynamically determines a set of storage area network components to be included in storage performance monitoring. Given an initial set of at least one SAN component that is to be monitored, the present invention dynamically adjusts the SAN component membership of the set and/or the monitoring attributes associated with each SAN component in the set. The adjusted SAN component set is then fed back into the monitoring process. In this manner, the attributes of the monitored SAN component set change dynamically to capture an appropriate level of monitoring data. Additionally, the present invention may determine, based on historical monitoring information, which members of the set merit a closer analysis to identify problem areas.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer readable storage medium having computer usable program code stored therein programmed to dynamically determine a set of storage area network (SAN) components for performance monitoring, the operations of the computer program product comprising:

monitoring SAN components of a predefined set of SAN components according to a monitor data structure associated with each SAN component;

capturing at least one threshold violation by a SAN component in the set, the threshold violation defined by a threshold violation data structure associated with the monitor data structure;

determining based on the monitor data structure, at least one SAN component responsible for the threshold violation;

determining, based on a connectivity data structure, at least one SAN component connected to the SAN component responsible for the threshold violation;

dynamically changing an attribute of the set of SAN components in response to the threshold violation by the SAN component in the set, wherein changing an attribute of the set of SAN components further comprises altering membership within the set based on violation analysis criteria, wherein altering membership within the set based on violation analysis criteria comprises adding one or more components to the set;

modifying the set of SAN components to include the determined one or more SAN components connected to the SAN component responsible for the threshold violation, wherein the at least one SAN component is logically connected to the SAN component responsible for the threshold violation such that the at least one SAN component is a member of a SAN zone that includes the SAN component responsible for the threshold violation; and monitoring SAN components of the changed set according to the monitor data structure for each SAN component within the changed set.

2. The computer readable storage medium of claim 1, further comprising analyzing SAN components of the set having altered membership based on SAN component analysis criteria and responding based on the analysis results.

3. The computer readable storage medium of claim 1, wherein the at least one SAN component is physically connected to the SAN component responsible for the threshold violation.

4. The computer readable storage medium of claim 1, wherein changing an attribute of the set of SAN components further comprises altering at least one attribute of at least one monitor data structure within the set of SAN components.

5. The computer readable storage medium of claim 4, wherein altering at least one attribute of at least one monitor data structure further comprises changing a threshold attribute such that the frequency of threshold violations changes.

6. The computer readable storage medium of claim 1, further comprising scanning the SAN for operational SAN components and defining the predefined set of SAN components based on SAN scan results, each SAN component represented by a monitor data structure.

7. A computer readable storage medium having computer usable program code stored therein programmed to dynamically determine a set of storage area network (SAN) components for performance monitoring, the operations of the computer program product comprising:

automatically defining a set of SAN components, each SAN component represented by a monitor data structure;

monitoring SAN components of the set according to the monitor data structure for each SAN component;

capturing at least one threshold violation by a SAN component in the set, the threshold violation defined by a threshold violation data structure associated with the monitor data structure;

determining based on the monitor data structure, at least one SAN component responsible for the threshold violation;

determining, based on a connectivity data structure, at least one SAN component connected to a SAN component responsible for the threshold violation;

dynamically changing an attribute of the set of SAN components in response to the at least one threshold violation, wherein changing an attribute of the set of SAN components further comprises altering membership within the set based on violation analysis criteria, wherein altering membership within the set based on violation analysis criteria comprises adding one or more components to the set;

modifying the set of SAN components to include the determined one or more SAN components connected to the SAN component responsible for the threshold violation, wherein the at least one SAN component is logically connected to the SAN component responsible for the threshold violation such that the at least one SAN component is a member of a SAN zone that includes the SAN component responsible for the threshold violation; and monitoring SAN components of the changed set according to the monitor data structure for each SAN component within the changed set.

8. The computer readable storage medium of claim 7, further comprising analyzing at least one SAN component in the set based on SAN component analysis criteria and wherein changing an attribute of the set of SAN components further comprises changing an attribute of the monitor data structure of the at least one SAN component in response to the analysis results.

9. The computer readable storage medium of claim 7, wherein the at least one SAN component is physically connected to the SAN component responsible for the threshold violation.

10. The computer readable storage medium of claim 7, wherein changing an attribute of the set of SAN components further comprises changing a threshold attribute such that the frequency of threshold violations changes.

11. The computer readable storage medium of claim 7, wherein automatically defining the set comprises scanning a SAN for operational SAN components and defining the set of SAN components based on SAN scan results, each SAN component represented by a monitor data structure.

12. A computer readable storage medium having computer usable program code stored therein programmed to dynamically determine a set of storage area network (SAN) components for performance monitoring, the operations of the computer program product comprising:

monitoring SAN components of a predefined set of SAN components according to a monitor data structure associated with each SAN component;

capturing at least one threshold violation by a SAN component in the set, the threshold violation defined by a threshold violation data structure associated with the monitor data structure;

determining based on the monitor data structure, at least one SAN component responsible for the threshold violation;

determining, based on a connectivity data structure, at least one SAN component connected to a SAN component responsible for the threshold violation;

dynamically modifying the set of SAN components to include the determined one or more connected SAN components responsible for the threshold violation, wherein modifying the set of SAN components further comprises altering membership within the set based on violation analysis criteria, wherein altering membership within the set based comprises adding one or more components to the set, wherein the at least one SAN component is logically connected to the SAN component responsible for the threshold violation such that the at least one SAN component is a member of a SAN zone that includes the SAN component responsible for the threshold violation;

monitoring SAN components of the modified set according to the monitor data structure for each SAN component within the modified set.

13. The computer readable storage medium of claim 12, wherein the one or more SAN components are physically connected to the SAN component responsible for the threshold violation.

14. The computer readable storage medium of claim 12, further comprising altering at least one attribute of at least one monitor data structure within the set of SAN components.

15. The computer readable storage medium of claim 14, wherein altering at least one attribute of at least one monitor data structure further comprises changing a threshold attribute such that the frequency of threshold violations changes.

16. The computer readable storage medium of claim 12, further comprising automatically defining the predefined set of SAN components, each SAN component represented by a monitor data structure.

* * * * *